US009796227B2

(12) United States Patent
McAllister

(10) Patent No.: US 9,796,227 B2
(45) Date of Patent: *Oct. 24, 2017

(54) BALL MOUNT FOR MEASURING TONGUE WEIGHT OF A TRAILER

(71) Applicant: Weigh Safe, LLC, Lindon, UT (US)

(72) Inventor: Kevin McAllister, American Fork, UT (US)

(73) Assignee: WEIGH SAFE, LLC, Lindon, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/145,452

(22) Filed: May 3, 2016

(65) Prior Publication Data
US 2017/0021684 A1    Jan. 26, 2017

Related U.S. Application Data

(63) Continuation of application No. 14/284,273, filed on May 21, 2014, now Pat. No. 9,327,566.
(Continued)

(51) Int. Cl.
B60D 1/06    (2006.01)
B60D 1/24    (2006.01)
(Continued)

(52) U.S. Cl.
CPC .............. *B60D 1/248* (2013.01); *B60D 1/06* (2013.01); *B60D 1/065* (2013.01); *B60D 1/62* (2013.01);
(Continued)

(58) Field of Classification Search
CPC .............. B60D 1/248; B60D 1/06; G01L 3/00
See application file for complete search history.

(56) References Cited

U.S. PATENT DOCUMENTS 245,201 A * 8/1881 Mills .................... G01G 19/083
                                                      177/139
665,017 A * 1/1901 Klein ....................... A41F 15/02
                                                       24/363
(Continued)

FOREIGN PATENT DOCUMENTS

DE       3612053 A1    10/1987
DE      10211572 A1    10/2003
(Continued)

Primary Examiner — Jacob D Knutson
Assistant Examiner — Gabriela C Craciun
(74) Attorney, Agent, or Firm — Thorpe North & Western, LLP; David W. Osborne

(57) ABSTRACT

A ball mount for measuring tongue weight of a trailer is disclosed. The ball mount can comprise a ball portion for interfacing with a ball configured to couple with a tongue of a trailer, a hitch portion for interfacing with a hitch receiver associated with a vehicle, and a load measurement device associated with the hitch portion. The hitch portion can be configured to pivot relative to the hitch receiver about a fulcrum in response to a downward force on the ball, with the hitch receiver resisting rotation of the hitch portion about the fulcrum thereby inducing a load on the hitch portion. The load measurement device can be configured to determine a magnitude of the downward force on the ball based on the load on the hitch portion.

18 Claims, 5 Drawing Sheets

Related U.S. Application Data

(60) Provisional application No. 61/826,247, filed on May 22, 2013, provisional application No. 61/928,166, filed on Jan. 16, 2014, provisional application No. 61/948,487, filed on Mar. 5, 2014.

(51) Int. Cl.

| | | |
|---|---|---|
| *G01L 3/00* | (2006.01) | |
| *B60D 1/62* | (2006.01) | |
| *G01L 7/16* | (2006.01) | |
| *G01L 19/10* | (2006.01) | |
| *G01L 5/10* | (2006.01) | |
| *G01G 19/12* | (2006.01) | |

(52) U.S. Cl.
CPC .............. *G01G 19/12* (2013.01); *G01L 3/00* (2013.01); *G01L 5/101* (2013.01); *G01L 7/163* (2013.01); *G01L 7/166* (2013.01); *G01L 19/10* (2013.01)

(56) References Cited

U.S. PATENT DOCUMENTS

| | | | | |
|---|---|---|---|---|
| 2,500,686 | A * | 3/1950 | Jontz | B60D 1/06 |
| | | | | 280/476.1 |
| 3,695,213 | A | 10/1972 | Littlefield | |
| 3,700,053 | A * | 10/1972 | Glissendorf | B60D 1/065 |
| | | | | 177/136 |
| 3,797,594 | A * | 3/1974 | Chaffee | B60D 1/248 |
| | | | | 177/136 |
| 4,056,155 | A * | 11/1977 | Wahl | B60D 1/248 |
| | | | | 177/145 |
| 4,239,253 | A | 12/1980 | Golze | |
| 4,319,766 | A | 3/1982 | Corteg et al. | |
| 4,522,421 | A * | 6/1985 | Vance | B60D 1/06 |
| | | | | 280/416.1 |
| 4,627,633 | A * | 12/1986 | Gehman | B60Q 1/52 |
| | | | | 280/432 |
| 4,996,770 | A * | 3/1991 | McCracken | E04G 17/14 |
| | | | | 248/357 |
| 5,040,817 | A * | 8/1991 | Dunn | B60D 1/065 |
| | | | | 280/504 |
| 5,116,072 | A * | 5/1992 | Swenson | B60D 1/07 |
| | | | | 280/511 |
| 5,290,057 | A * | 3/1994 | Pellerito | B60D 1/60 |
| | | | | 280/507 |
| 5,890,726 | A * | 4/1999 | McCoy | B60D 1/06 |
| | | | | 280/406.1 |
| 6,053,521 | A * | 4/2000 | Schertler | B60D 1/06 |
| | | | | 280/422 |
| 6,253,626 | B1 * | 7/2001 | Shoberg | G01L 5/161 |
| | | | | 73/775 |
| 6,270,107 | B1 * | 8/2001 | Stoughton | B60D 1/065 |
| | | | | 280/507 |
| 6,494,478 | B1 * | 12/2002 | MacKarvich | B60D 1/06 |
| | | | | 177/136 |
| 6,629,701 | B1 | 10/2003 | Colibert | |
| 6,722,684 | B1 * | 4/2004 | McAllister | B60D 1/06 |
| | | | | 177/146 |
| 6,829,943 | B2 * | 12/2004 | Weyand | G01G 19/086 |
| | | | | 340/667 |
| 7,960,659 | B2 | 6/2011 | Cleary | |
| 8,033,563 | B2 * | 10/2011 | Good | B60D 1/065 |
| | | | | 280/416.1 |
| 8,226,107 | B2 | 7/2012 | Columbia | |
| 8,276,932 | B2 | 10/2012 | Columbia | |
| 8,371,603 | B2 | 2/2013 | Columbia | |
| 8,376,387 | B2 | 2/2013 | Columbia | |
| 8,380,390 | B2 * | 2/2013 | Sy | B60T 8/1708 |
| | | | | 280/400 |
| 8,534,695 | B2 | 9/2013 | Columbia | |
| 8,840,130 | B2 | 9/2014 | Columbia | |
| 9,004,523 | B2 | 4/2015 | Scharf | |
| 9,327,566 | B2 | 5/2016 | McAllister | |
| 2001/0045725 | A1 * | 11/2001 | McCoy | B60D 1/06 |
| | | | | 280/511 |
| 2002/0140207 | A1 * | 10/2002 | McCoy | B60D 1/06 |
| | | | | 280/511 |
| 2005/0283296 | A1 * | 12/2005 | Viaud | B60D 1/58 |
| | | | | 701/50 |
| 2006/0032679 | A1 * | 2/2006 | Wilson | G01G 19/08 |
| | | | | 177/136 |
| 2006/0290102 | A1 * | 12/2006 | VanBuskirk | B60D 1/58 |
| | | | | 280/511 |
| 2009/0107735 | A1 * | 4/2009 | Cleary | G01G 19/08 |
| | | | | 177/136 |
| 2009/0302574 | A1 * | 12/2009 | Columbia | B60D 1/06 |
| | | | | 280/507 |
| 2010/0332049 | A1 * | 12/2010 | Sy | B60T 8/1708 |
| | | | | 701/1 |
| 2012/0024081 | A1 * | 2/2012 | Baker | B60D 1/06 |
| | | | | 73/862.338 |
| 2013/0038436 | A1 * | 2/2013 | Brey | B60T 7/16 |
| | | | | 340/431 |
| 2013/0080078 | A1 * | 3/2013 | Wirthlin | G01L 1/2243 |
| | | | | 702/42 |
| 2013/0253814 | A1 * | 9/2013 | Wirthlin | G01G 19/02 |
| | | | | 701/124 |
| 2014/0110918 | A1 * | 4/2014 | McCoy | B60D 1/248 |
| | | | | 280/511 |
| 2014/0327229 | A1 * | 11/2014 | Scharf | B60D 1/248 |
| | | | | 280/511 |
| 2015/0069737 | A1 * | 3/2015 | McAllister | B60D 1/62 |
| | | | | 280/511 |

FOREIGN PATENT DOCUMENTS

| | | |
|---|---|---|
| DE | 202011105552 U1 | 9/2012 |
| EP | 2363307 A2 | 9/2011 |
| WO | WO 2007/002278 A2 | 1/2007 |

\* cited by examiner

BALL MOUNT FOR MEASURING TONGUE WEIGHT OF A TRAILER

PRIORITY DATA

This application is a continuation of U.S. patent application Ser. No. 14/284,273, filed May 21, 2014, now issued as U.S. Pat. No. 9,327,566, which claims the benefit of U.S. Provisional Patent Application Ser. Nos. 61/826,247, filed on May 22, 2013, 61/928,166, filed on Jan. 16, 2014, and 61/948,487, filed on Mar. 5, 2014, each of which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the tongue weight or static downward force that the trailer applies to the hitch of the tow vehicle. If the tongue of the trailer does not apply enough downward force to the hitch, a dangerous condition called trailer sway could result. If the tongue of the trailer applies too much downward force to the hitch, then the rear tires of the tow vehicle can be overloaded, thus pushing the rear of the vehicle around and compromising steering and/or braking of the tow vehicle. A generally acceptable tongue weight for any trailer is somewhere between 9% and 15% of the gross trailer weight (GTW). Measuring tongue weight typically involves weighing the tongue weight of the trailer when decoupled from the tow vehicle, which can be time consuming and dangerous.

SUMMARY OF THE INVENTION

Accordingly, the present disclosure provides trailer hitch devices, systems, and associated methods thereof. In one aspect, for example, a ball mount for measuring tongue weight of a trailer is provided. Such a ball mount can include a ball portion for interfacing with a ball configured to couple with a tongue of a trailer. The ball mount can also include a hitch portion for interfacing with a hitch receiver associated with a vehicle. In addition, the ball mount can include a load measurement device associated with the hitch portion. The hitch portion can be configured to pivot relative to the hitch receiver about a fulcrum in response to a downward force on the ball, the hitch receiver resisting rotation of the hitch portion about the fulcrum thereby inducing a load on the hitch portion. The load measurement device can be configured to determine a magnitude of the downward force on the ball based on the load on the hitch portion.

The present disclosure also provides a trailer hitch system for measuring tongue weight of a trailer. Such a system can include a hitch receiver associated with a vehicle, a trailer having a tongue for coupling the trailer to the vehicle, and a ball mount. The ball mount can include a ball portion supporting a ball configured to couple with the tongue of the trailer, a hitch portion for interfacing with the hitch receiver, and a load measurement device associated with the hitch portion. The hitch portion can be configured to pivot relative to the hitch receiver about a fulcrum in response to a downward force on the ball, the hitch receiver resisting rotation of the hitch portion about the fulcrum thereby inducing a load on the hitch portion. The load measurement device can be configured to determine a magnitude of the downward force on the ball based on the load on the hitch portion.

The present disclosure additionally provides a method of measuring tongue weight of a trailer. Such a method can include obtaining a hitch receiver associated with a vehicle. The method can also include obtaining a trailer having a tongue for coupling the trailer to the vehicle. The method can further include obtaining a ball mount having a ball portion supporting a ball configured to couple with the tongue of the trailer, a hitch portion for interfacing with the hitch receiver, and a load measurement device associated with the hitch portion, wherein the hitch portion is configured to pivot relative to the hitch receiver about a fulcrum in response to a downward force on the ball, the hitch receiver resisting rotation of the hitch portion about the fulcrum thereby inducing a load on the hitch portion, and wherein the load measurement device is configured to determine a magnitude of the downward force on the ball based on the load on the hitch portion. The method can still further include engaging the tongue of the trailer with the ball. Additionally, the method can include observing the magnitude of the downward force on a display.

DETAILED DESCRIPTION OF THE INVENTION

Definitions

Figure 1:
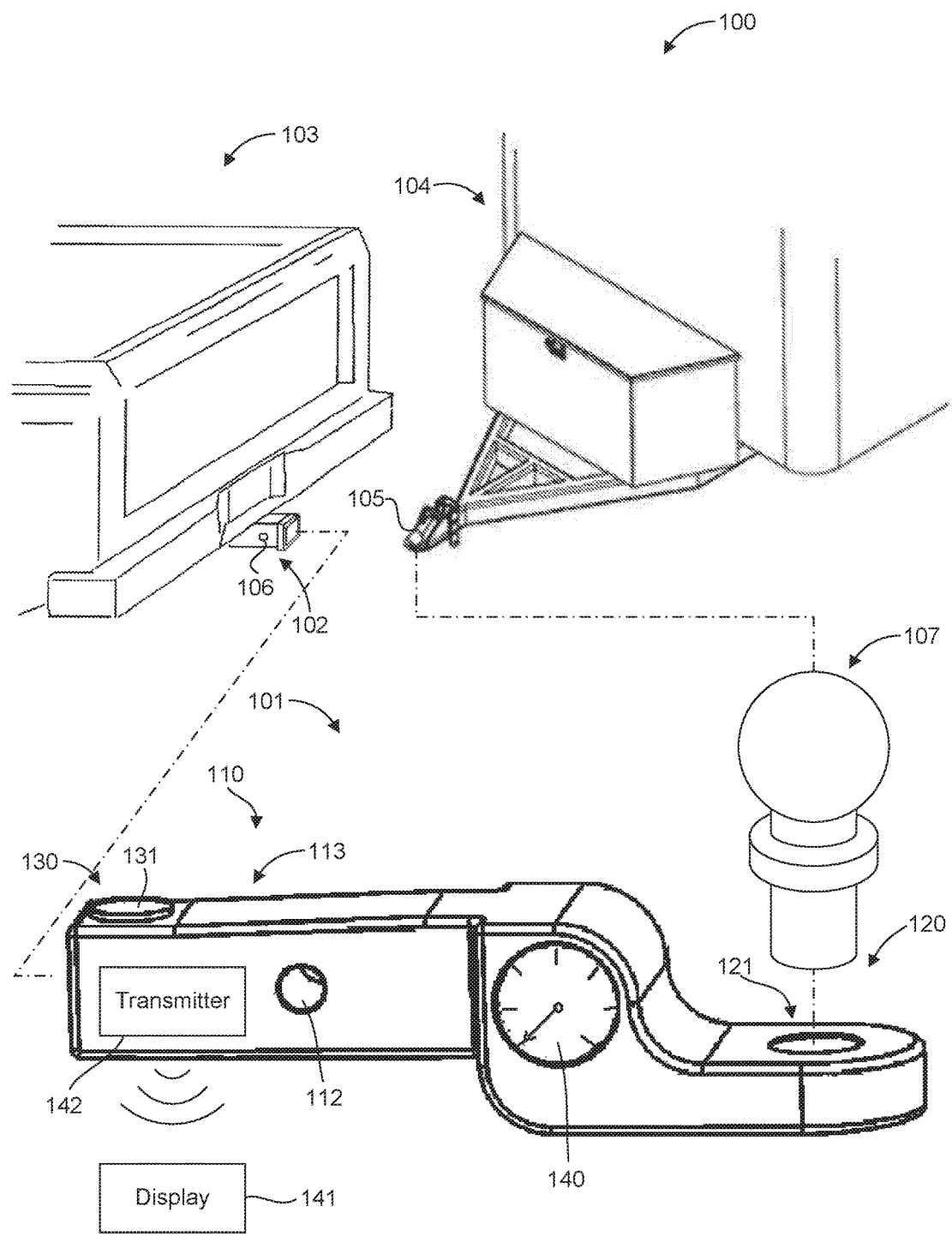
FIG. 1 illustrates a trailer hitch system for measuring tongue weight of a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

With reference to FIG. 1, illustrated is a trailer hitch system 100 for measuring tongue weight of a trailer, in accordance with an example of the present disclosure. The system 100 can include a hitch receiver 102 associated with a vehicle 103 and a trailer 104 having a tongue 105 for coupling the trailer to the vehicle. The system 100 can also include a ball mount 101 configured to measure tongue weight of the trailer 104.

The ball mount 101 can include a hitch portion 110 for interfacing with the hitch receiver 102. The hitch receiver 102 can be any typical hitch receiver, such as a standard 2½", 2", or 1¼" size square hitch receiver. The hitch portion can include a hole 112 or other suitable feature to facilitate securing the ball mount 101 to the hitch receiver 102, such as with a pin or threaded fastener through the hole 102 of the ball mount 101 and a hole 106 of the hitch receiver 102. The ball mount 101 can also include a ball portion 120 for interfacing with a ball 107 configured to couple with the tongue 105 of the trailer 104. The ball portion 120 can include a coupling feature 121 configured to couple to the ball 107 in any suitable manner, such as with a threaded coupling, a clearance hole for a threaded fastener, or other removable coupling. In one aspect, the ball 107 can be coupled to the ball portion 120 with a weld or other a permanent coupling.

The ball mount 101 can also include a load measurement device 130 associated with the hitch portion 110. The load measurement device 130 can be configured to determine a magnitude of the downward force on the ball 107 and, therefore, the tongue weight of the trailer 104. It should be recognized that any suitable load measurement device can be utilized. For example, the load measurement device 130 can comprise a load cell or transducer, such as a strain gage load cell, a mechanical load cell, a hydraulic load cell, and/or a pneumatic load cell, or any other suitable type of load cell. In one aspect, the load measurement device 130 can comprise an interface portion 131 configured to interface with the hitch receiver 102. For example, as shown in the figure, the interface portion 131 can be located at a top side 113 of the hitch portion 110 to interface with an upper interior surface of the hitch receiver 102.

In addition, the ball mount 101 can include a display 140 configured to indicate the magnitude of the downward force, as determined by the load measurement device 130. In one aspect, the display 140 can be associated with the ball portion 120, as shown in the figure. The display 140 can be any suitable type of display, such as an analog or a digital display. The display 140 can be coupled to the load measurement device 130 in any suitable manner such that the display can properly indicate the magnitude of the load on the ball 107. In one aspect, the display can be mechanically, electrically, hydraulically, and/or pneumatically coupled to the load measurement device 130. The load measurement device 130 and/or the display 140 can therefore include any suitable mechanical, electrical, hydraulic, and/or pneumatic device or mechanism that can facilitate the determination and/or display of the magnitude of the load on the ball 107. For example, the load measurement device 130 and/or the display 140 can include a processor and/or memory to determine the magnitude of the load on the ball 107. In one aspect, a mobile device, such as a smartphone or a tablet, can include a processor and/or memory used to determine the magnitude of the load on the ball 107, such as by executing an application. In another aspect, the display 140 can be calibrated to indicate the magnitude of the load on the ball 107, based on mechanical, electrical, hydraulic, and/or pneumatic input from the load measurement device 130. In a particular aspect, therefore, the display 140 can be integral with the load measurement device 130 in determining the magnitude of the load on the ball 107.

The ball mount can also include a transmitter 142 such that load data pertaining to the magnitude of the downward force on the ball 107 can be wired or wirelessly transmitted to the display 140. In one aspect, the transmitter can transmit load data to a location remote from the ball hitch, such as to a remote display 141. For example, the display 141 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the display 141 can comprise a screen of a mobile device, such as a smartphone or a tablet. Thus, the load data can be communicated to any suitable location, in or out of the vehicle. It should therefore be recognized that the display 140, 141 can be disposed in any suitable location and can be in communication with the load measurement device 130 via any suitable means. In one aspect, the load measurement device 130, the display 140, and/or the transmitter 150, or any other related item or device, such as a processor, memory, a battery, or a RF receiver, can be located in or on the ball mount 101.

Although the trailer hitch system 100 includes what is generally referred to as a "ball mount" throughout the present disclosure for coupling with a trailer, it should be recognized that the trailer hitch system can include any suitable form of coupling with a trailer, such as a lunette ring and pintle hook. Aspects of the present disclosure that facilitate measuring tongue weight of a trailer by utilizing an interaction between a receiver hitch and a hitch portion can be incorporated into such coupling arrangements.

Figure 2:
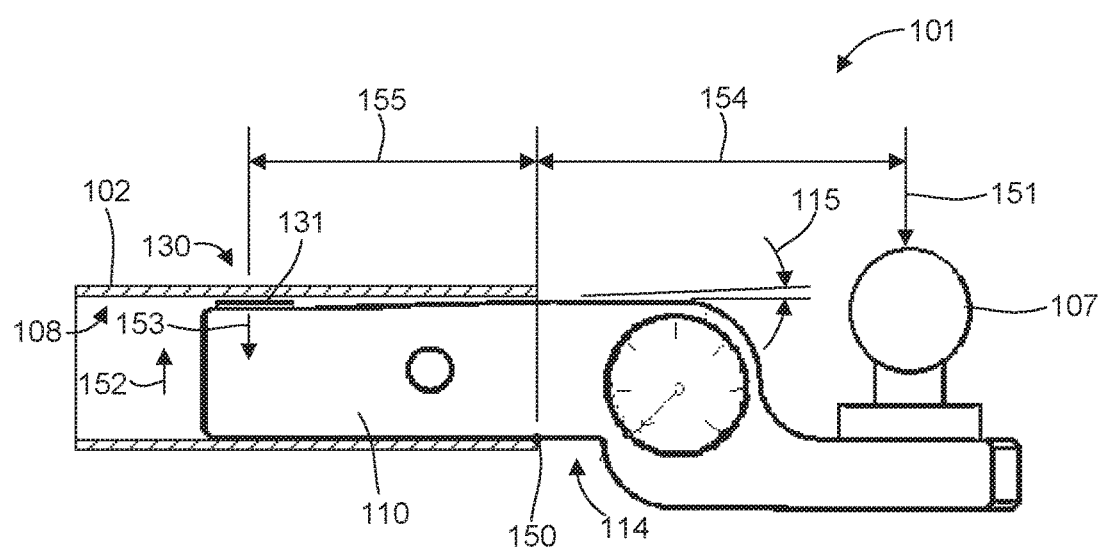
FIG. 2 is a detailed schematic illustration of a ball mount and a hitch receiver of the trailer hitch system of FIG. 1.

FIG. 2 is a schematic illustration of the ball mount 101 of FIG. 1 inserted into the hitch receiver 102. As shown in FIG. 2, the ball mount 101 is configured to pivot relative to the hitch receiver 102 about a fulcrum 150 in response to a downward force 151 on the ball 107. The fulcrum 150 can be defined by an interface between a bottom side 114 of the hitch portion 110 and the hitch receiver 102, such as a lower interior surface or outer edge of an opening. The pivoting of the ball mount 101 about the fulcrum 150 in direction 152 can cause the hitch portion 110 to move upward. The hitch receiver 102, such as an upper interior surface 108, resists rotation of the hitch portion 110 in direction 152 about the fulcrum 150 by exerting a reaction force 153 on the hitch portion 110, which induces a load, such as a force and/or moment, on the hitch portion 110.

In one aspect, the load measurement device 130 can be configured to determine a magnitude of the downward force 151 on the ball 107 based on the load or a portion or a component of the load on the hitch portion 110. For example, the load measurement device 130 can determine a magnitude of the force 153 exerted on the interface portion 131 of the load measurement device 130 by the hitch receiver 102. The magnitude of the downward force 151 on the ball 107 can be determined using the magnitude of the force 153, a distance 154 between the ball 107 and the fulcrum 150, and a distance 155 between the interface portion 131 of the load measurement device 130 and the fulcrum 150. The downward force 151 on the ball 107 can therefore be determined using an interaction or interface between the hitch portion 110 of the ball mount 101 and the hitch receiver 102. It should be recognized that the interface portion 131 of the load measurement device 130 can be located at any suitable location on the hitch portion 110 and configured to facilitate contact of the interface portion 131 and the hitch receiver 102 at any suitable location.

In one aspect, the hitch portion 110 can be configured to facilitate the pivoting action about the fulcrum 150, such as by having a taper at an angle 115 that tapers narrower toward the location of the interface portion 131 of the load measurement device 130 to provide a rotational range of motion for the hitch portion 110 within the hitch receiver 102.

Figure 3:
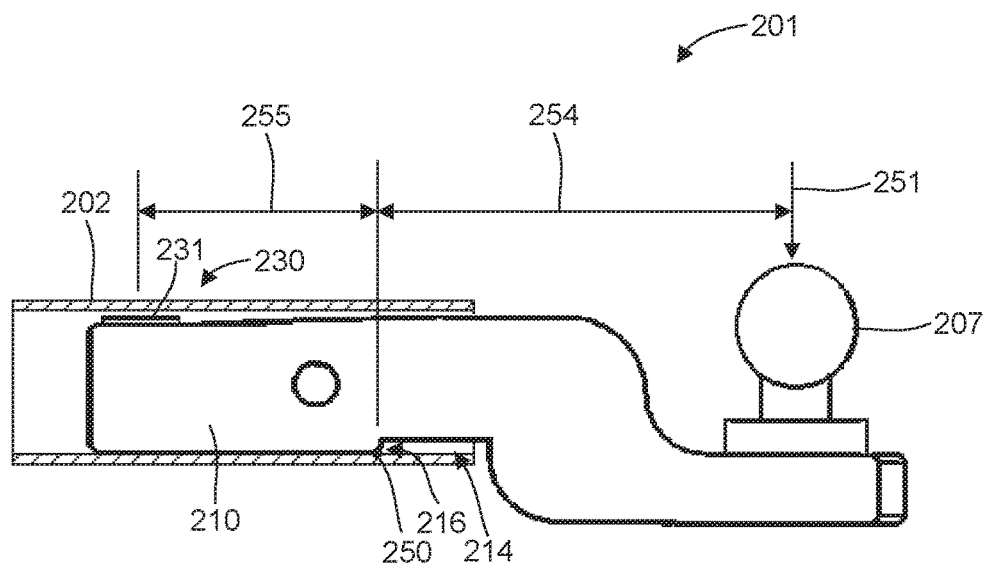
FIG. 3 illustrates a ball mount for measuring tongue weight of a trailer, in accordance with another example of the present disclosure.

FIG. 3 is a schematic illustration of a ball mount 201 for measuring tongue weight of a trailer, in accordance with another example of the present disclosure, shown inserted into a hitch receiver 202. The ball mount 201 includes some similarities with the ball mount 101 of FIGS. 1 and 2. For example, the ball mount 201 includes a hitch portion 210 for interfacing with the hitch receiver 202 and a load measurement device 230 associated with the hitch portion 210 and configured to determine a magnitude of a downward force 251 on a ball 207.

In this case, the hitch portion 210 includes a fulcrum feature 216 on a bottom side 214 of the hitch portion 210 configured to form a fulcrum 250 by interfacing with the hitch receiver 202. The fulcrum feature 216 can be defined by a protrusion from the hitch portion 210 to ensure contact by the fulcrum feature 216 with the hitch receiver 202 such that the ball mount 201 rotates about the fulcrum feature 216. For example, the hitch portion 210 can be locally recessed on the bottom side 214 to form the fulcrum feature 216 and ensure that the bottom side 214 of the hitch portion 210 provides unencumbered rotation of the ball mount 201 about the fulcrum feature 216 when engaged with the hitch receiver 202. In one aspect, the fulcrum feature 216 can be located at a known distance 254 from the ball 207 and at a known distance 255 from an interface portion 231 of the load measurement device 230. The fulcrum feature 216 can therefore ensure that the fulcrum 250 formed by the interface between the hitch portion 210 and the hitch receiver 202 is at a consistent and known location relative to the interface portion 231 and the ball 207, regardless of how far into the hitch receiver 202 the hitch portion 210 is inserted (so long as the interface portion 231 and the fulcrum feature 216 are within the hitch receiver 202), which can ensure accurate determinations of the downward force 251 on the ball 207.

Figure 4:
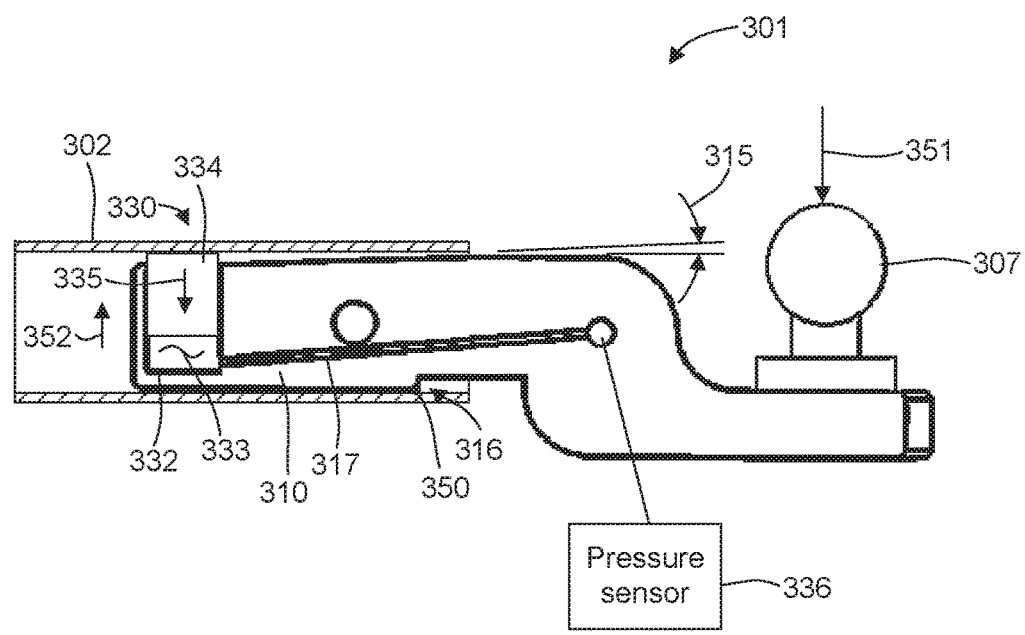
FIG. 4 illustrates a ball mount for measuring tongue weight of a trailer, in accordance with yet another example of the present disclosure.

FIG. 4 is a schematic illustration of a ball mount 301 for measuring tongue weight of a trailer, in accordance with yet another example of the present disclosure, shown inserted into a hitch receiver 302. The ball mount 301 includes some similarities with other ball mounts disclosed herein. For example, the ball mount 301 includes a hitch portion 310 for interfacing with the hitch receiver 302 and a load measurement device 330 associated with the hitch portion 310 and configured to determine a magnitude of a downward force 351 on a ball 307.

In this case, the load measurement device 330 can include a reservoir 332 associated with the hitch portion 310, as well as a fluid 333 and a piston 334, which can be disposed in the reservoir 332. The piston 334 can be configured to interface with the hitch receiver 302 and affect a pressure of the fluid 333 as a result of a downward force 351 on the ball 307. For example, upon application of the downward force 351, the ball mount 301 can pivot on the hitch receiver 302 about a fulcrum 350 formed by a fulcrum feature 316. The pivoting of the ball mount 301 in direction 352 about the fulcrum 350 can cause the hitch portion 310 to move upward in direction. This can cause the piston 334 to contact an upper interior surface or wall of the hitch receiver 302, which can force the piston 334 to move in direction 335 within the reservoir 332, causing a pressure change in the fluid 333. In one aspect, the hitch portion 310 can be configured to facilitate the pivoting action about the fulcrum 350, such as by having a taper at an angle 315 that tapers narrower toward the location of the piston 334 to provide a rotational range of motion for the hitch portion 310 within the hitch receiver 302. It should be recognized that the reservoir 332 and piston 334 can be located at any suitable location on the hitch portion 310 and configured to facilitate contact of the piston 334 and the hitch receiver 302 at any suitable location. For example, the reservoir 332 and piston 334 can be located at a forward end of the hitch portion 310, such as near a forward outer edge of the hitch receiver 302. In this case, a fulcrum can be at an end of the hitch portion 310 within the hitch receiver 302.

Additionally, the load measurement device 330 can include a pressure sensor 336 in fluid communication with the reservoir, such as via a conduit 317. The pressure sensor 336 can be configured to indicate a magnitude of the downward force 351 based on the pressure of the fluid. In one aspect, the pressure sensor 336 can include a pressure gage that is calibrated to mechanically indicate, such as with a dial readout, the magnitude of the downward force 351 acting on the ball 307. In another aspect, the pressure sensor 336 can include a transducer configured to output an electrical signal based on the pressure of the fluid. The electrical signal can be received by a processor that can determine the magnitude of the downward force 351 on the ball 307 based on the pressure represented by the electrical signal. The magnitude of the downward force 351 can then be displayed, such as on an electronic display.

Figure 5:
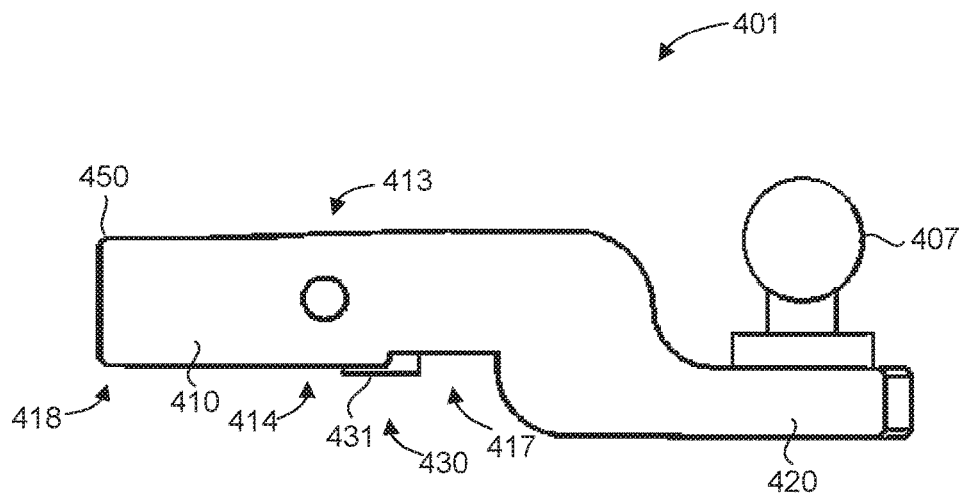
FIG. 5 illustrates a ball mount for measuring tongue weight of a trailer, in accordance with still another example of the present disclosure.

FIG. 5 is a schematic illustration of a ball mount 401 for measuring tongue weight of a trailer, in accordance with still another example of the present disclosure. The ball mount 401 includes some similarities with other ball mounts disclosed herein. For example, the ball mount 401 includes a hitch portion 410 for interfacing with a hitch receiver (omitted for clarity) and a load measurement device 430 associated with the hitch portion 410 and configured to determine a magnitude of a downward force on a ball 407.

In this case, an interface portion 431 of the load measurement device 430 can be located at a bottom side 414 of the hitch portion 410 and can therefore be configured to contact a lower interior surface of the hitch receiver. For example, as shown in the figure, the interface portion 431 can be located at a proximal end 417 of the hitch portion 410 toward a ball portion 420 of the ball mount 401. A fulcrum can therefore be at an end of the hitch portion 410 within the hitch receiver. For example, reference number 450 indicates a location on a top side 413 of a free or distal end 418 of the hitch portion 410 that may form a fulcrum about which the ball mount 401 can pivot when a downward force is applied to the ball 407, thus causing a reaction force to be applied to the interface portion 431 from the hitch receiver in response to the downward force on the ball 407. In one aspect, the interface portion 431 of the load measurement device 430 can act as a fulcrum until the ball mount pivots sufficient to engage or contact an upper interior surface of the hitch receiver at location 450.

Figure 6:
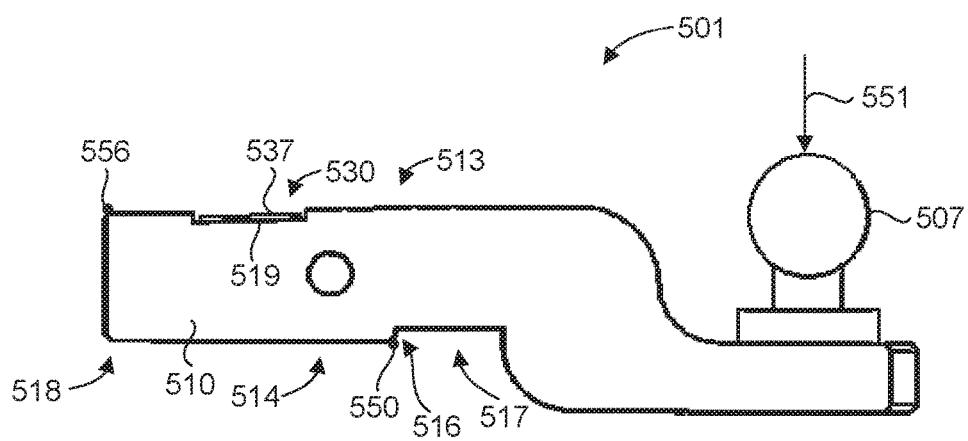
FIG. 6 illustrates a ball mount for measuring tongue weight of a trailer, in accordance with a further example of the present disclosure.

FIG. 6 is a schematic illustration of a ball mount 501 for measuring tongue weight of a trailer, in accordance with a further example of the present disclosure. The ball mount 501 includes some similarities with other ball mounts disclosed herein. For example, the ball mount 501 includes a hitch portion 510 for interfacing with a hitch receiver (omitted for clarity) and a load measurement device 530 associated with the hitch portion 510 and configured to determine a magnitude of a downward force 551 on a ball 507.

In this case, the load measurement device 530 can include a strain gage 537 disposed on a surface 519 of the hitch portion 510. In one aspect, the strain gage 537 can be located on a recessed surface to prevent or minimize the likelihood of damage to the strain gage 537, such as when inserting the hitch portion 510 into and removing the hitch portion 510 from the hitch receiver. In response to the downward force 551 on the ball 507, the ball mount 501 can pivot about a fulcrum 550, such as formed by a fulcrum feature 516, at a bottom side 514 of a proximal end 517 of the hitch portion 510. A top side 513 of a free or distal end 518 of the hitch portion 510 can contact an upper interior surface of the hitch receiver, identified by reference number 556, to resist rotation of the ball mount 501 and induce a load in the hitch portion 510. The strain gage 537 can be configured to measure deformation of the hitch portion 510 at the outer surface 519, which can then be used to determine the downward force on the ball 507 that caused the deformation. Although the strain gage 537 is shown located on an outer surface on a top side 513 of the hitch portion 510, it should be recognized that one or more strain gages can be located on any suitable surface, such as on a bottom, a side, and/or an interior surface of the hitch portion 510.

In one aspect, the present disclosure can provide a method of measuring tongue weight of a trailer. The method can comprise obtaining a hitch receiver associated with a vehicle. The method can also comprise obtaining a trailer having a tongue for coupling the trailer to the vehicle. The method can further comprise obtaining a ball mount having a ball portion supporting a ball configured to couple with the tongue of the trailer, a hitch portion for interfacing with the hitch receiver, and a load measurement device associated with the hitch portion, wherein the hitch portion is configured to pivot relative to the hitch receiver about a fulcrum in response to a downward force on the ball, the hitch receiver resisting rotation of the hitch portion about the fulcrum thereby inducing a load on the hitch portion, and wherein the load measurement device is configured to determine a magnitude of the downward force on the ball based on the load on the hitch portion. The method can still further comprise engaging the tongue of the trailer with the ball. Additionally, the method can comprise observing the magnitude of the downward force on a display.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A ball mount for measuring tongue weight of a trailer, comprising:
    a ball portion for interfacing with a ball configured to couple with a tongue of a trailer;
    a hitch portion for interfacing with a hitch receiver associated with a vehicle; and
    a load measurement device associated with the hitch portion,
    wherein the hitch portion is configured to pivot relative to the hitch receiver about a fulcrum in response to a downward force on the ball, the hitch receiver resisting rotation of the hitch portion about the fulcrum thereby inducing a load on the hitch portion, wherein the fulcrum is defined by an interface between a bottom side of the hitch portion and the hitch receiver and
    wherein the load measurement device is configured to determine a magnitude of the downward force on the ball based on the load on the hitch portion.

2. The ball mount of claim 1, wherein the load measurement device comprises:
    a reservoir having a fluid and a piston disposed therein, wherein the piston is configured to interface with the hitch receiver and affect a pressure of the fluid as a result of the downward force on the ball; and
    a pressure sensor in fluid communication with the reservoir.

3. The ball mount of claim 1, further comprising a display configured to indicate the magnitude of the downward force.

4. The ball mount of claim 3, wherein the display is associated with the ball portion.

5. The ball mount of claim 1, further comprising a transmitter to communicate the magnitude of the downward force on the ball to a remote display.

6. The ball mount of claim 1, wherein the load measurement device comprises a load cell.

7. The ball mount of claim 6, wherein the load cell comprises a strain gage load cell, a mechanical load cell, a hydraulic load cell, a pneumatic load cell, or combinations thereof.

8. The ball mount of claim 1, wherein the load measurement device comprises a strain gage disposed on an outer surface of the hitch portion.

9. The ball mount of claim 1, wherein the load measurement device comprises an interface portion configured to interface with the hitch receiver.

10. The ball mount of claim 9, wherein the interface portion is located at a top side of the hitch portion.

11. The ball mount of claim 9, wherein the interface portion is located at a bottom side of the hitch portion.

12. The ball mount of claim 11, wherein the interface portion is located at a proximal end of the hitch portion.

13. The ball mount of claim 1, wherein the hitch portion comprises a fulcrum feature on the bottom side of the hitch portion configured to form the fulcrum.

14. A trailer hitch system for measuring tongue weight of a trailer, comprising:
   a hitch receiver associated with a vehicle;
   a trailer having a tongue for coupling the trailer to the vehicle; and
   a ball mount having
      a ball portion supporting a ball configured to couple with the tongue of the trailer,
      a hitch portion for interfacing with the hitch receiver, said hitch portion comprising a fulcrum feature on a bottom side of the hitch portion configured to form a fulcrum by interfacing with the hitch receiver, and
      a load measurement device associated with the hitch portion,
   wherein the hitch portion is configured to pivot relative to the hitch receiver about the fulcrum in response to a downward force on the ball, the hitch receiver resisting rotation of the hitch portion about the fulcrum thereby inducing a load on the hitch portion, and
   wherein the load measurement device is configured to determine a magnitude of the downward force on the ball based on the load on the hitch portion.

15. The system of claim 14, wherein the load measurement device comprises:
   a reservoir having a fluid and a piston disposed therein, wherein the piston is configured to interface with the hitch receiver and affect a pressure of the fluid as a result of the downward force on the ball; and
   a pressure sensor in fluid communication with the reservoir.

16. The system of claim 14, wherein the load measurement device comprises a strain gage load cell, a mechanical load cell, a hydraulic load cell, a pneumatic load cell, or combinations thereof.

17. The system of claim 14, further comprising a display configured to indicate the magnitude of the downward force.

18. A method of measuring tongue weight of a trailer, comprising:
   obtaining a hitch receiver associated with a vehicle;
   obtaining a trailer having a tongue for coupling the trailer to the vehicle;
   obtaining a ball mount having
      a ball portion supporting a ball configured to couple with the tongue of the trailer,
      a hitch portion for interfacing with the hitch receiver, said hitch portion comprising a fulcrum feature on a bottom side of the hitch portion configured to form a fulcrum by interfacing with the hitch receiver, and
      a load measurement device associated with the hitch portion,
   wherein the hitch portion is configured to pivot relative to the hitch receiver about the fulcrum in response to a downward force on the ball, the hitch receiver resisting rotation of the hitch portion about the fulcrum thereby inducing a load on the hitch portion, and
   wherein the load measurement device is configured to determine a magnitude of the downward force on the ball based on the load on the hitch portion;
   engaging the tongue of the trailer with the ball; and
   observing the magnitude of the downward force on a display.

* * * * *